(12) United States Patent
Ogiso et al.

(10) Patent No.: US 12,176,959 B2
(45) Date of Patent: Dec. 24, 2024

(54) HIGH-SPEED OPTICAL TRANSCEIVER

(71) Applicant: Nippon Telegraph and Telephone Corporation, Tokyo (JP)

(72) Inventors: Yoshihiro Ogiso, Musashino (JP); Hiromasa Tanobe, Musashino (JP); Shogo Yamanaka, Musashino (JP); Josuke Ozaki, Musashino (JP); Mitsuteru Ishikawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 94 days.

(21) Appl. No.: 17/793,768

(22) PCT Filed: Feb. 28, 2020

(86) PCT No.: PCT/JP2020/008469
§ 371 (c)(1),
(2) Date: Jul. 19, 2022

(87) PCT Pub. No.: WO2021/171599
PCT Pub. Date: Sep. 2, 2021

(65) Prior Publication Data
US 2023/0069120 A1  Mar. 2, 2023

(51) Int. Cl.
*H04B 10/40* (2013.01)
*H04B 10/2575* (2013.01)
*H04B 10/80* (2013.01)

(52) U.S. Cl.
CPC ..... *H04B 10/803* (2013.01); *H04B 10/25759* (2013.01); *H04B 10/40* (2013.01)

(58) Field of Classification Search
CPC . H04B 10/803; H04B 10/25759; H04B 10/40
USPC .......................................................... 398/164
See application file for complete search history.

(56) References Cited

U.S. PATENT DOCUMENTS

| 10,139,578 | B2 | 11/2018 | Huang et al. | |
|---|---|---|---|---|
| 2016/0356955 | A1* | 12/2016 | Sugiyama | G02F 1/2255 |
| 2018/0205465 | A1* | 7/2018 | Tanaka | H04B 10/5053 |
| 2020/0026145 | A1* | 1/2020 | Ogiso | G02F 1/011 |

FOREIGN PATENT DOCUMENTS

| JP | 2005128440 A | * | 5/2005 | .......... G02B 6/122 |
|---|---|---|---|---|
| JP | 2015119437 A | * | 6/2015 | .......... H04B 10/564 |
| JP | 2015-146515 A | | 8/2015 | |
| JP | 2017-003655 A | | 1/2017 | |
| JP | 2018-113644 A | | 7/2018 | |
| WO | 2018/174083 A1 | | 9/2018 | |

* cited by examiner

*Primary Examiner* — Mohammad R Sedighian
(74) *Attorney, Agent, or Firm* — Workman Nydegger

(57) ABSTRACT

Provided is a high-speed optical transmission-reception apparatus including a digital-signal processing circuit and optical modulation and optical reception modules, in which a flexible printed circuit is used as a high-frequency interface for the optical modulation and optical reception modules, a mechanism for connecting the high-frequency line pattern to the flexible printed circuit is provided on a package substrate of the digital-signal processing circuit, and the package substrate and the optical modulation and optical reception modules are connected by the flexible printed circuit.

12 Claims, 9 Drawing Sheets

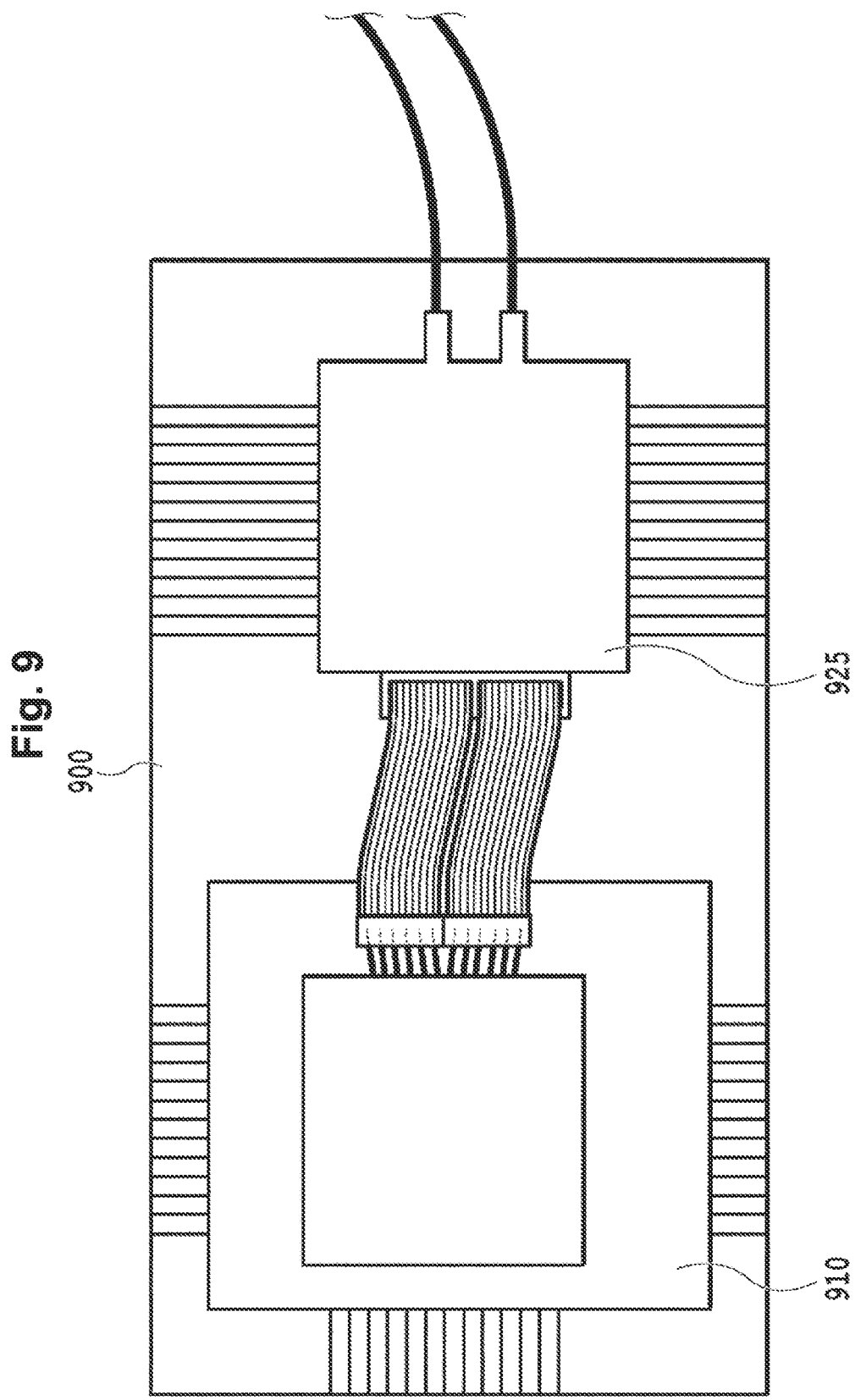

HIGH-SPEED OPTICAL TRANSCEIVER

TECHNICAL FIELD

The present invention relates to a high-speed optical transmission-reception apparatus having a digital-signal processing circuit and including an optical transmitter (optical modulator) and an optical receiver.

BACKGROUND ART

Digital-signal processing techniques including digital coherent have been introduced in optical fiber communication systems, and backbone network transmission techniques achieving 100 Gbps per wavelength have been established. Currently, high-speed transmission of 400 to 600 Gbps per wavelength has reached a practical level.

In a 100G digital coherent system in the early stage, as illustrated in FIG. 1, each part (ICs, photonic IC (PIC)) had an individual package, and for example, each part was mounted on a printed circuit board (PCB).

In a conventional 100G digital coherent system in FIG. 1, a DSP package substrate 110 is mounted on a PCB board substrate 100 and is electrically connected to it with a ball grid array (BGA) 101. On the DSP package substrate 110 is mounted a DSP-ASIC 111 chip.

Electrical input and output of the DSP package substrate 110 are connected via printed line on the PCB board substrate 100 and surface-mounted lead pins 102 to a driver/TIA 130, then connected via this driver/TIA 130 to an optical modulation (optical reception) module 120.

The optical modulation (optical reception) module 120 receives modulated electrical signals, performs optical modulation on them, and outputs the modulated light to optical fiber 140. The optical modulation (optical reception) module 120 receives signal lights from the optical fiber 140, converts the signal lights into electrical signals, and sends the electrical signals to the DSP package substrate 110, where the DSP-ASIC 111 processes received signals.

In the case of systems exceeding 400G, analog parts are required to be adapted to a wider bandwidth (for example, a modulation bandwidth 40 GHz or more). Hence, for the purposes of reducing high-frequency losses and downsizing, configurations as illustrated in FIG. 2 are attracting attention: a configuration on the transmission side in which an RF driver and an optical modulator are integrated into one package and mounted (coherent driver modulator: CDM), and a configuration on the reception side in which a transimpedance amplifier TIA and a light receiver PD are integrated into one package and mounted (integrated coherent receiver: ICR). (In the following description, both configurations are referred to as CDM configurations.)

Although description of the same functions as in FIG. 1 is omitted, a conventional 400G digital coherent system in FIG. 2 includes an integrally mounted optical modulation (optical reception) module 225 in which a driver/TIA and an optical modulation (optical reception) module are integrally mounted.

In addition, in order to reduce deterioration in high-frequency characteristics resulting from packaging and mounting, attempts as illustrated in FIG. 3 are also being made to mount all the high-frequency analog ICs on the package substrate the same as the one on which the DSP is mounted (DSP co-package mounting). In FIG. 3, although description of the same functions as in FIGS. 1 and 2 is omitted, an integrally mounted optical modulation (optical reception) module in which all the high-frequency analog ICs are mounted on the same package substrate 310 as the one on which a DSP is mounted (DSP co-package mounting) is used.

In this case, a DSP-ASIC that generates heat in the order of watts and an optical transmission-reception device are disposed on one and the same package substrate so as to be close to each other, and thus for the optical transmission-reception device, one that has less characteristic fluctuation against temperature changes or rises (less temperature dependence) is desired.

For materials for the optical transmission-reception device, instead of conventional lithium niobate (LN) optical modulators, semiconductor-based optical modulators are attracting attention in the viewpoint of downsizing and cost reduction. In particular, for higher-speed modulation operation, compound semiconductors using compounds typified by InP are mainly used, and for systems having importance on further downsizing and cost reduction, research and development are concentrated on Si-based optical devices.

Semiconductor optical modulators also have advantages and disadvantage unique to their materials. For example, for InP optical modulators, it is thought that in order to control band-edge absorption effects, temperature control with a controller is indispensable in modulation operation. Si modulators have an advantage that temperature control is not necessary, but their electro-optical effects are smaller than those of other material-based modulators. Thus, in the case of Si modulator, the electric-light interaction length needs to be longer, and this may result in an increase in high-frequency losses. Hence, there are many issues to achieve higher speed (wider bandwidth).

To make conventional optical transmitter-receivers as illustrated in FIGS. 1 to 3 operate higher speed, it is important not only to speed up ICs (for example, Si-CMOS or the like) and PICs (for example, optical modulation devices, optical reception devices, and the like) but also to make packaging and high-frequency line adapted to higher speed (lower RF losses) and to make smaller the losses in the electrical connections between components (lower reflection). In other words, it can be said that from the viewpoint of achieving higher speed related to mounting, the configuration in FIG. 2 having a higher degree of integration and the co-package configuration in FIG. 3 including a plurality of chips are more advantageous for achieving higher speed than the individual-package configuration illustrated in FIG. 1.

From the above background, for Si-based optical modulators having less temperature dependence, more highly integrated DSP co-package configurations are being studied, and for InP-based optical modulators having high temperature dependence, configurations in which, separately from a DSP that generates much heat, only a high-frequency amplification device (driver IC) is mounted in the same package (for example, CDM) are often employed. Note that an optical modulation device in this case is, in general, mounted on a temperature controller (TEC), and its temperature is controlled (to be constant).

CITATION LIST

Patent Literature

Patent Literature 1: Japanese Patent Laid-Open No. 2015-146515

SUMMARY OF THE INVENTION

Technical Problem

As described above, mounting configurations of conventional semiconductor optical modulators are mainly classified into the CDM configuration illustrated in FIG. 2 (the receiver side is also referred to as ICR, and in the case of a transmitter-receiver integrated package, this is also referred to as an integrated coherent transmitter and receiver optical sub-assembly (IC-TROSA)) and the DSP co-package configuration illustrated in FIG. 3.

Here, in order to achieve higher speed in the entire optical transmitter (receiver), it is necessary to speed up each IC and the PIC and to make line connecting those and everything about the packaging and mounting adapted to higher speed (wider bandwidth). However, each of the foregoing two conventional mounting configurations has a problem that prevents achieving wider bandwidth, as below.

Problem in CDM Configuration

For example, high-speed analog electrical signals outputted from a digital/analog conversion circuit (DAC) provided in the DSP-ASIC are transmitted in the order of the ASIC→the DSP package substrate→the PCB board substrate→the optical modulation module, where the electrical signals are converted into optical signals. For the electrical interfaces, for example, the surface mount technology (SMT), flexible printed circuits (FPCs), and flexible printed line boards are used.

In this case, it is necessary to transmit electrical signals through multiple high-frequency circuit substrates of different types, and thus the length of electrical line is elongated, increasing electrical losses.

In addition, for connection between substrates, especially for the ball grid array (BGA) connection portion between the DSP package and the PCB board, solder balls having diameters of a hundred to several hundred micro meters are used for connection. Thus, for high-frequency signals of 50 GHz or more, electrical reflection caused by impedance mismatch at solder ball connecting portions is a factor that degrades high-frequency characteristics largely.

This high-frequency characteristic deterioration was not cited as a serious problem in conventional 400G systems (64 G baud rate as a modulation baud rate, about 40 GHz as a required bandwidth), but it is a big obstacle to achieve next-generation 800G or 1 T systems (required bandwidth>50 GHz).

Hence, even if an optical modulation module including an InP modulation device having a modulation bandwidth of 50 GHz or more is used, it is difficult to achieve necessary bandwidth characteristics as the entire optical transmitter (receiver).

Besides the above problem, in the structure for the case in which a low-loss FPC is used for a high-frequency interface for the optical module, as illustrated in a sectional side view of an example in which an FPC is used for a conventional CDM mounting system in FIG. 4, the FPC is connected from an optical module terrace having a different height to a portion on the PCB board. Thus, the FPC 450 need to be bent sharply when it is mounted.

If the FPC is bent, it increases mounting stress at the connection portions of the FPC, causing reliability problems. In addition, there are also concerns about change in high-frequency characteristics caused by the bending (change in characteristic impedances) and increase in electrical losses due to the longer line length.

Problem in DSP Co-Package Configuration

A widely-known method for solving the above problem is the DSP co-package mounting configuration also illustrated in FIG. 3. In this configuration, as illustrated in FIG. 3, not only the DSP-ASIC 311 but also the driver (TIA) 330 and the optical modulator (optical receiver) PIC 325 are mounted on the package substrate 310, and thus high-frequency electrical signals can be electrically supplied to the optical modulator through the shortest line without passing through solder balls or the like.

However, since Si-based modulators having less temperature dependence are mainly used as optical modulators in the current situation, for achieving higher speed (wider bandwidth) as described above, improvement in characteristics of optical modulation devices themselves is cited as a serious issue.

In general, the bandwidth and the modulation efficiency (related to drive voltage $V\pi$, modulation-output optical intensity, and the like) in optical modulators are in a trade-off relationship, and thus, a design only prioritizing expansion of the bandwidth, on the contrary, leads to deterioration in the signal-to-noise ratio (SNR) of modulated light, resulting in signal quality deterioration.

In addition, aiming to compensate for the deterioration in the SNR, if a compound semiconductor optical amplification device such as an SOA is mounted in addition to the Si modulation device, problems raised are cost increase due to temperature control for this amplification device itself and increase in the number of mounted parts, and increase in power consumption.

In addition, if an InP modulator, instead of an Si modulator, is mounted in the same package as the DSP, as DSP co-packaging, the composition of the InP modulator core needs to be changed (to reduce the band-edge absorption in the material). In that case, there is also a problem that the modulation efficiency of the InP modulator itself decreases (decrease in quantum-confined Stark effect (QCSE)), leading to deterioration in the SNR.

Means for Solving the Problem

To solve the foregoing problems, in the present invention, an InP optical modulator having excellent properties in high speed operation is mounted on an optical modulation module, and a flexible printed circuit (FPC) is used as a high-frequency interface for directly connecting a DSP package substrate and the optical modulation module.

For improvement in the modulation efficiency and long-term stable operation of the InP modulation device, the optical modulation module may desirably have a temperature controller (TEC). In addition, it is desirable to make the inside of the module airtight and put inert gas in it for long term stability of the optical characteristics.

In addition, a structure is employed in which a high-frequency line pattern on the DSP package substrate and a mechanism for connecting to the FPC board are provided on the DSP package substrate not having a metal lid, and high-frequency signals are electrically supplied directly to the optical transmission module via the FPC (not via the PCB board substrate).

Employing the structure as above makes it possible to prevent high-frequency losses resulting from part-mounting between the IC and the PIC and to drive the InP optical modulator having excellent wide bandwidth properties, using high-speed and high-quality electrical signals. The present invention plays an important role, in particular, in building next generation 800 Gbps or 1 Tbps (per wavelength) systems in which the required bandwidth of the optical transmitter-receiver is 50 GHz or more (100 G baud rate as the modulation baud rate (symbol rate)).

Embodiments has, for example, the following configurations.

Configuration 1

A high-speed optical transmission-reception apparatus comprising:
a digital-signal processing circuit;
at least one of an optical modulation module having at least a driver and an optical modulation device or an optical reception module having at least a transimpedance amplifier and an optical reception device;
a flexible printed circuit being used as a high-frequency interface for the optical modulation module and the optical reception module; and
a mechanism for connecting a high-frequency line pattern to the flexible printed circuit, the mechanism being provided on a package substrate of the digital-signal processing circuit,
wherein the package substrate and at least one of the optical modulation module or the optical reception module are directly connected by the flexible printed circuit.

Configuration 2

The high-speed optical transmission-reception apparatus according to configuration 1, in which
the temperature of the optical modulation device mounted on the optical modulation module is controlled by a temperature controller.

Configuration 3

The high-speed optical transmission-reception apparatus according to configuration 1 or 2, in which
the optical modulation module is hermetically packaged.

Configuration 4

The high-speed optical transmission-reception apparatus according to configuration 1, in which
an InP substrate is used for the optical modulation device mounted on the optical modulation module, and the optical modulation device includes at least two or more Mach-Zehnder optical interference waveguides.

Configuration 5

The high-speed optical transmission-reception apparatus according to any one of configurations 1 to 4, in which
the optical modulation module or the optical reception module includes, in addition to the optical modulation device or the optical reception device, a high-frequency amplification device.

Configuration 6

The high-speed optical transmission-reception apparatus according to any one of configurations 1 to 5, in which
the 3 dB bandwidth of the optical modulation module or the optical reception module is higher than or equal to 50 GHz.

Configuration 7

The high-speed optical transmission-reception apparatus according to any one of claims 1 to 6, in which
the mechanism that connects to the flexible printed circuit is configured by connector connection.

Configuration 8

The high-speed optical transmission-reception apparatus according to any one of configurations 1 to 7, in which
the height difference between the height of a package terrace of the optical modulation module or the optical reception module and the height of an upper surface of the package substrate of the digital-signal processing circuit is less than or equal to 2 mm.

Effects of the Invention

With this configuration, in an optical transmission-reception apparatus having a digital-signal processing circuit and including an optical transmitter (optical modulator) and an optical receiver, it is possible to connect, by using flexible printed circuits, a package substrate of the digital-signal processing circuit and optical modulation and optical reception modules in a wide bandwidth while preventing high-frequency losses, and this makes it possible to achieve a high-speed optical transmission-reception apparatus.

BRIEF DESCRIPTION OF DRAWINGS

FIG. 9 is a plan view of an optical transmission-reception apparatus of Example 3 of the present invention.

DESCRIPTION OF EMBODIMENTS

Hereinafter, examples of the present invention will be described in detail.

Figure 1:
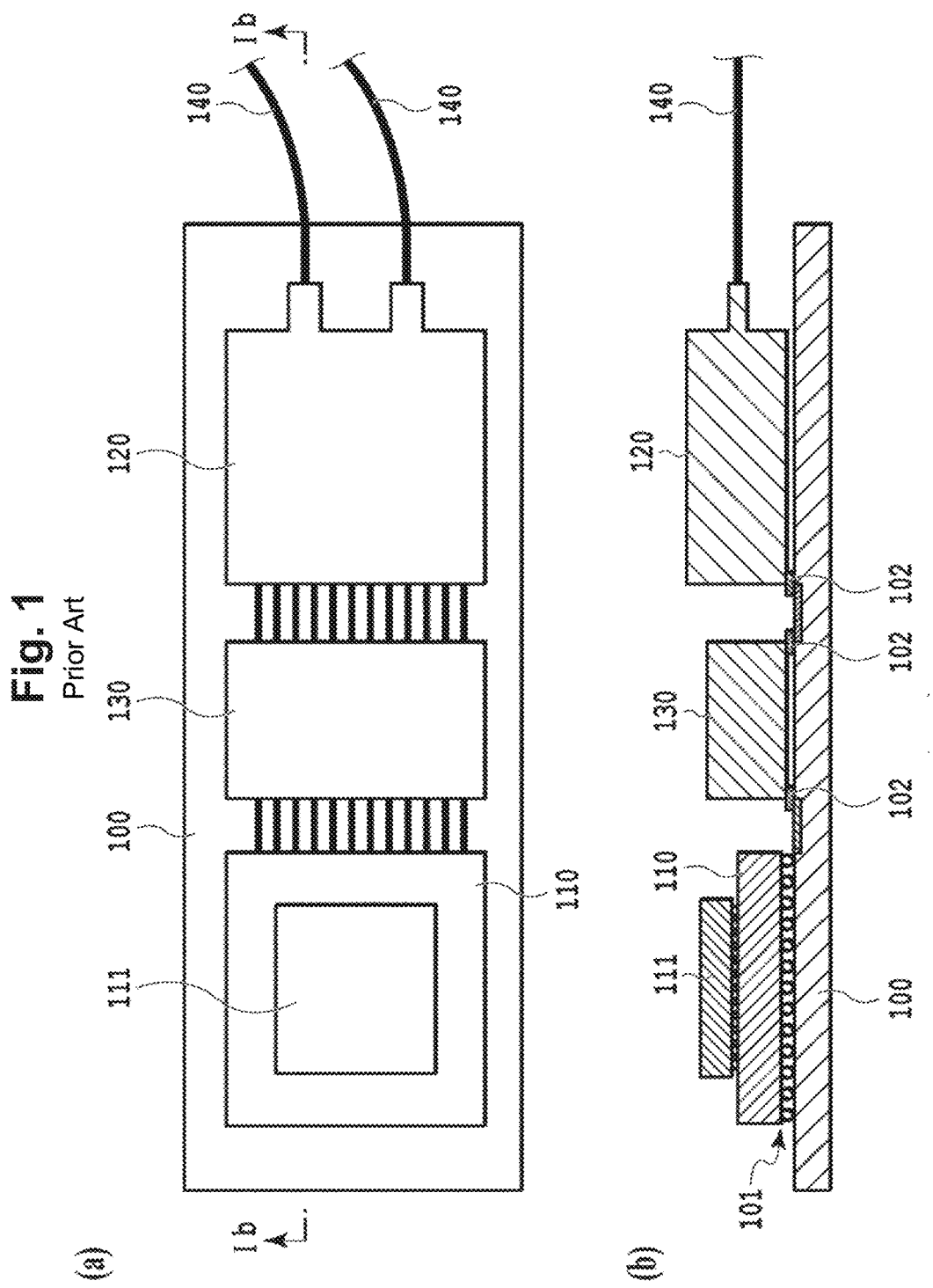
FIG. 1 is a plan view and a sectional side view of a conventional 100G digital coherent system.
Figure 2:
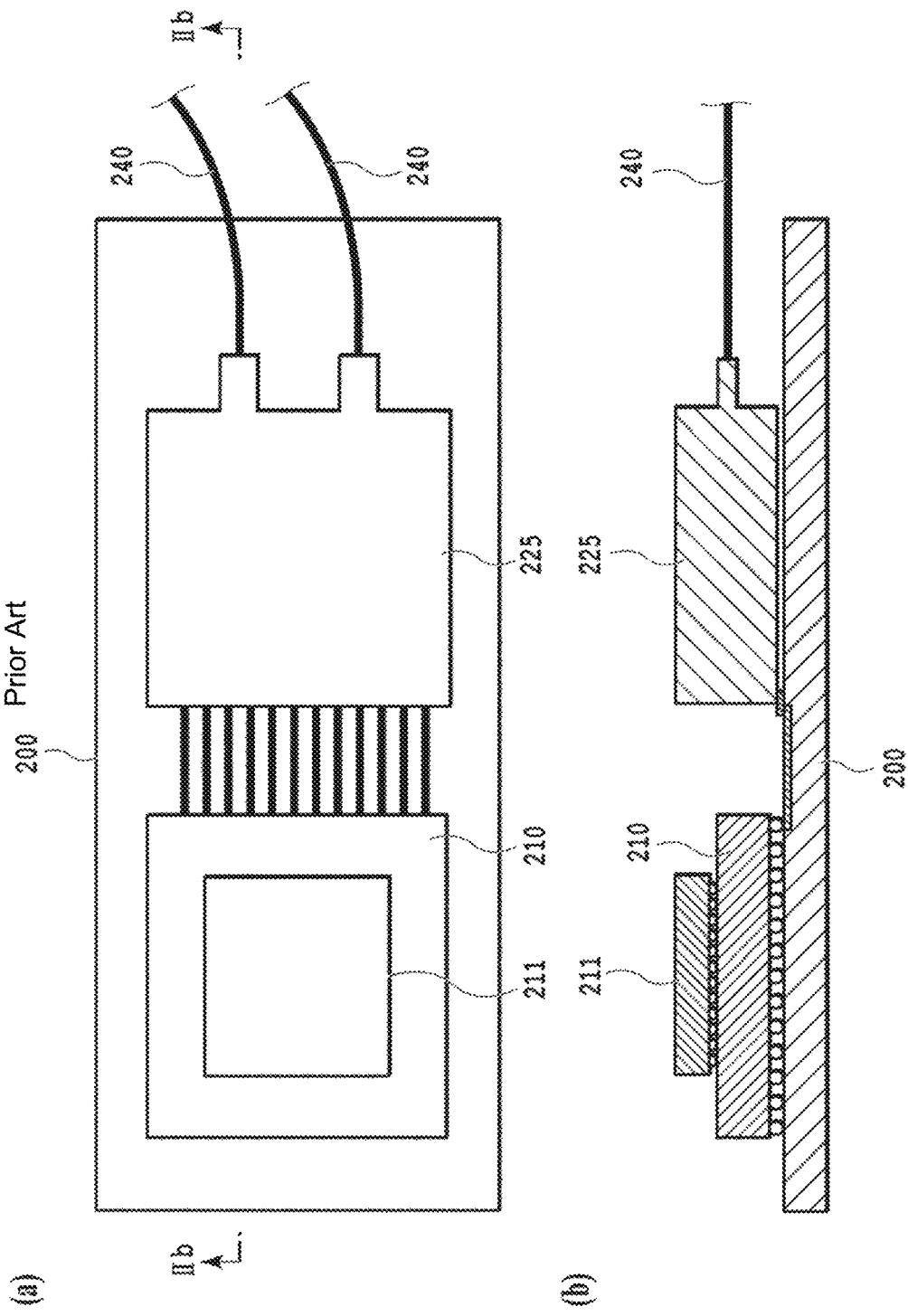
FIG. 2 is a plan view and a sectional side view of a conventional 400G digital coherent system.
Figure 3:
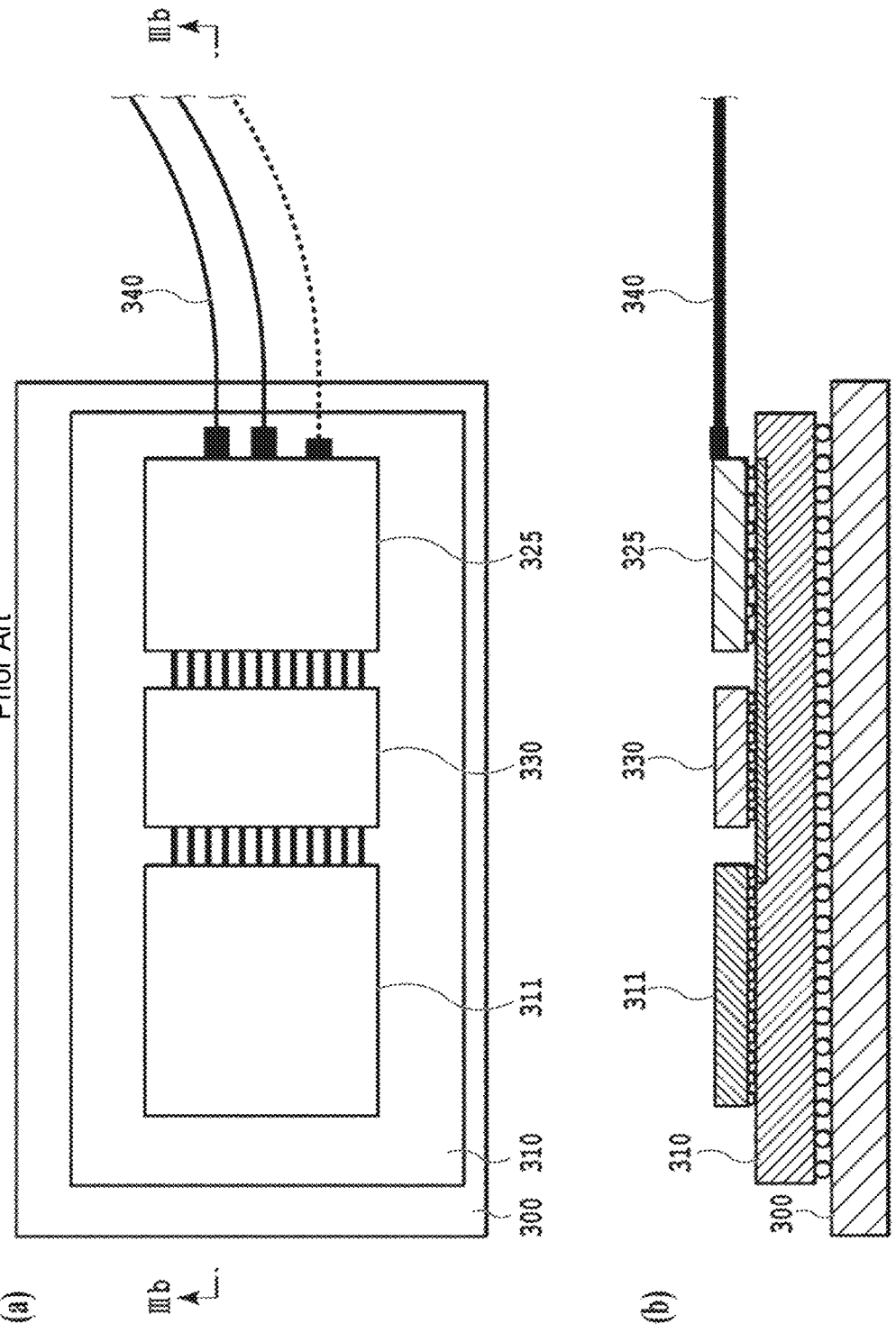
FIG. 3 is a plan view and a sectional side view of a system formed by conventional DSP co-package mounting.
Figure 4:
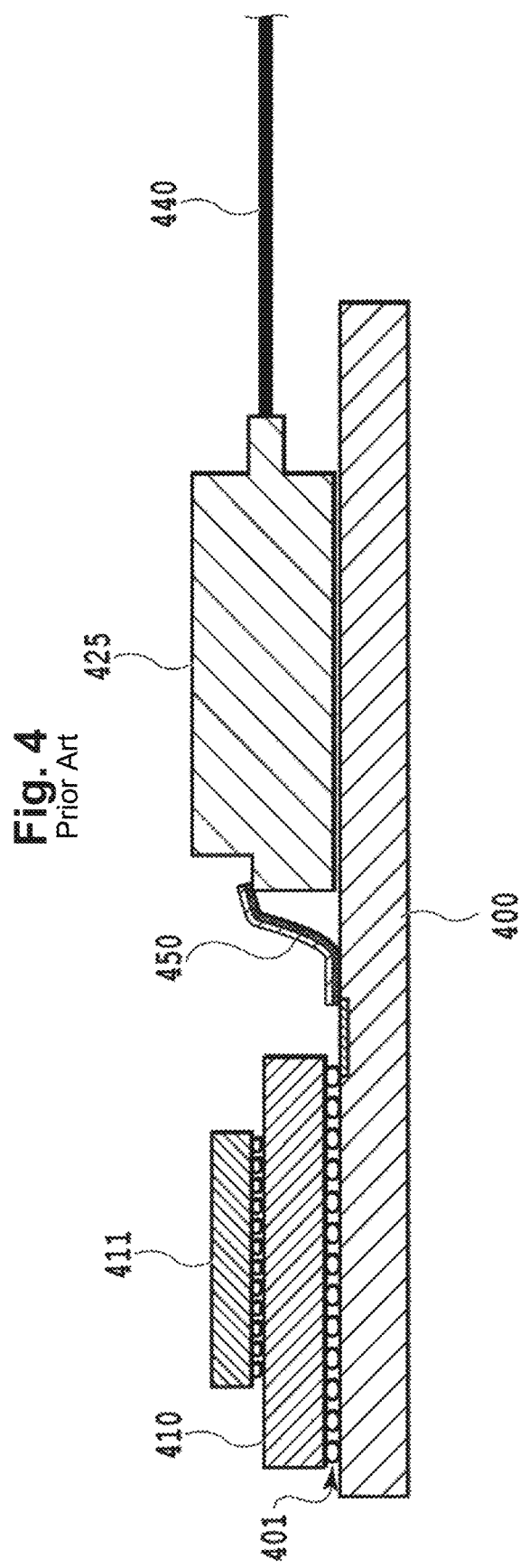
FIG. 4 is a sectional side view of an example in which an FPC is used in a system formed by conventional CDM mounting.
Figure 5:
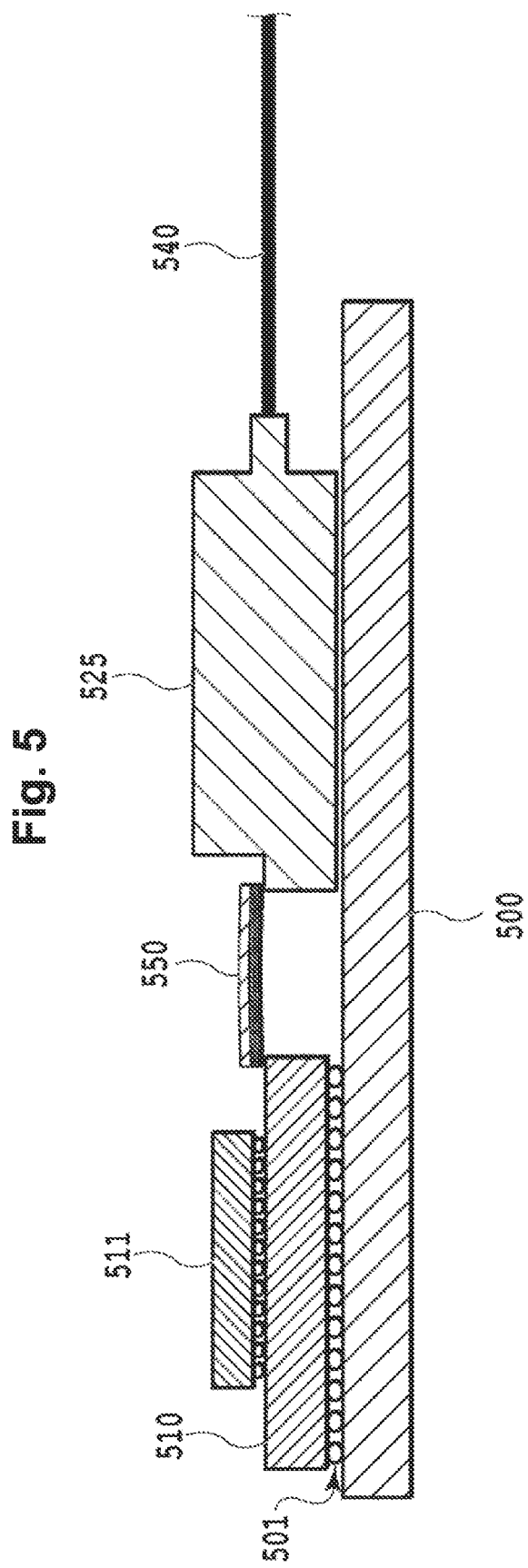
FIG. 5 is a sectional side view of an optical transmission-reception apparatus, illustrating an outline configuration of the present invention.

FIG. 5 is a sectional side view of an optical transmission-reception apparatus, illustrating an outline configuration of the present invention. In the present invention, as illustrated in FIG. 5, a DSP package substrate 510 is mounted on an upper left portion of a PCB board substrate 500 and connected to it with a BGA 501, and a DSP-ASIC 511 is mounted on the DSP package substrate 510.

An optical modulation (reception) module 525 on the right is mounted such that the height difference between the height of a package terrace (the portion having a shelf-like surface at the middle level of the package height) of the module and the height of the upper surface of the DSP package substrate 510 is less than or equal to 2 mm. The optical modulation (reception) module 525 is directly connected to the DSP package substrate 510 with a flexible printed circuit (FPC 550) serving as a high-frequency interface, and through which the optical modulation (reception) module 525 is supplied with electrical signals.

The DSP package substrate 510 may be mounted with the height of the upper surface being adjusted such that the height difference is less than or equal to 2 mm. In short, the FPC 550 only needs to be reliably connected without having a sharp bend.

Although in this example, the FPC 550 has a structure having at least 2 layers, a base film (upper layer) and a copper foil (lower layer), the structure is not limited to this example. The same applies to the following description.

Example 1

Figure 6:
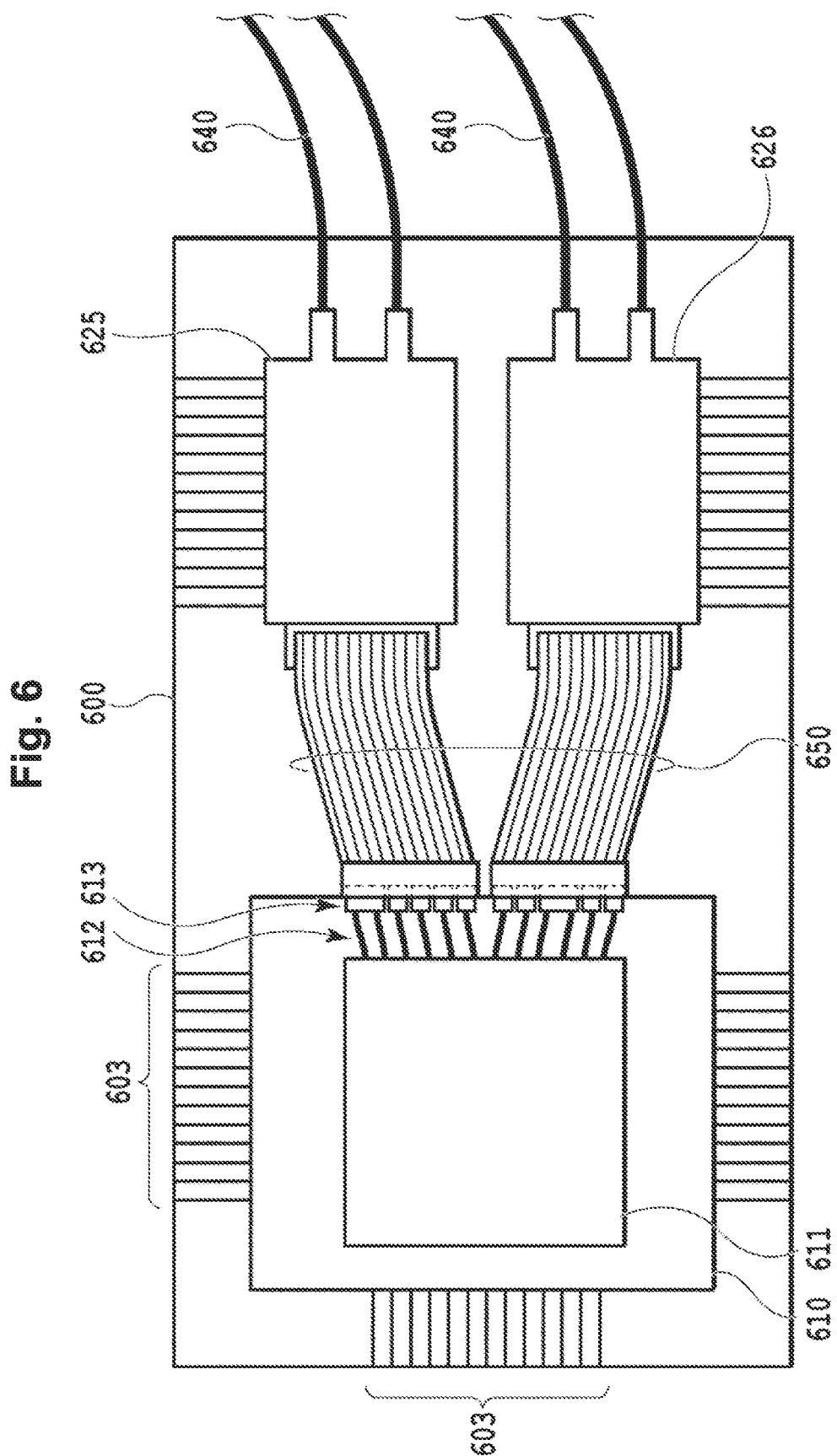
FIG. 6 is a plan view of an optical transmission-reception apparatus of Example 1 of the present invention.

FIG. 6 is a plan view of an optical transmission-reception apparatus for digital coherent communication, according to Example 1 of the present invention. In FIG. 6, a DSP package substrate 610 having a DSP-ASIC 611 on it is mounted on a left portion of a PCB board substrate 600, and low-speed signal interfaces 603 are connected to the DSP package substrate 610 at the left end or the upper and lower ends of the PCB board substrate 600. Low-speed electrical signals are converted by the DSP-ASIC 611 into high-frequency signals, which are inputted to or outputted from FPC interfaces 650 via expansion line 612 and connection PADs 613 on the right side of the DSP-ASIC. The connection PADs 613 may be replaced with FPC connectors.

The FPC interfaces 650 are connected to an optical transmission module CDM 626 and an optical reception module ICR 625, which perform photoelectric conversion, and transmit and receive optical signals to and from optical fibers 640 at the right end. The FPC connection may be at least one of between the DSP package substrate 610 and the transmission (modulation) module CDM 726 or between the DSP package substrate 610 and the optical reception module ICR 725. The optical transmission module CDM and the optical reception module ICR may also receive connection of low-speed electrical signals as necessary.

In the assumption here, the optical transmission-reception apparatus of Example 1 in FIG. 6 employs a polarization multiplexing IQ optical modulation method, and the high-frequency signals are inputted to and outputted from the DSP-ASIC 611 through four channels for each of the input and output. (X polarization I channel/X polarization Q channel/Y polarization I channel/Y polarization Q channel)

Because one channel in general has a differential pair of electrical signals, the number of signal lines for high-frequency line is in total 16, 8 lines for each of optical transmission and optical reception (2 differential pn lines×4 channels). The electrical signals are transmitted through FPCs 650 between the optical transmission-reception modules (CDM 626 and ICR 625) and the DSP-ASIC 611. The transmission length and the off-set length of the FPC 650 are determined by considering the mounting spaces for the optical transmission module (CDM 626) and the optical reception module (ICR 625). In this example, the line length of the FPCs is 15 mm in consideration of assembling workability of each part, but it is clear that the line length does not affect the usefulness of the invention. (Note that high-frequency signals in each channel may be single-phase signals instead of differential signals)

Figure 7:
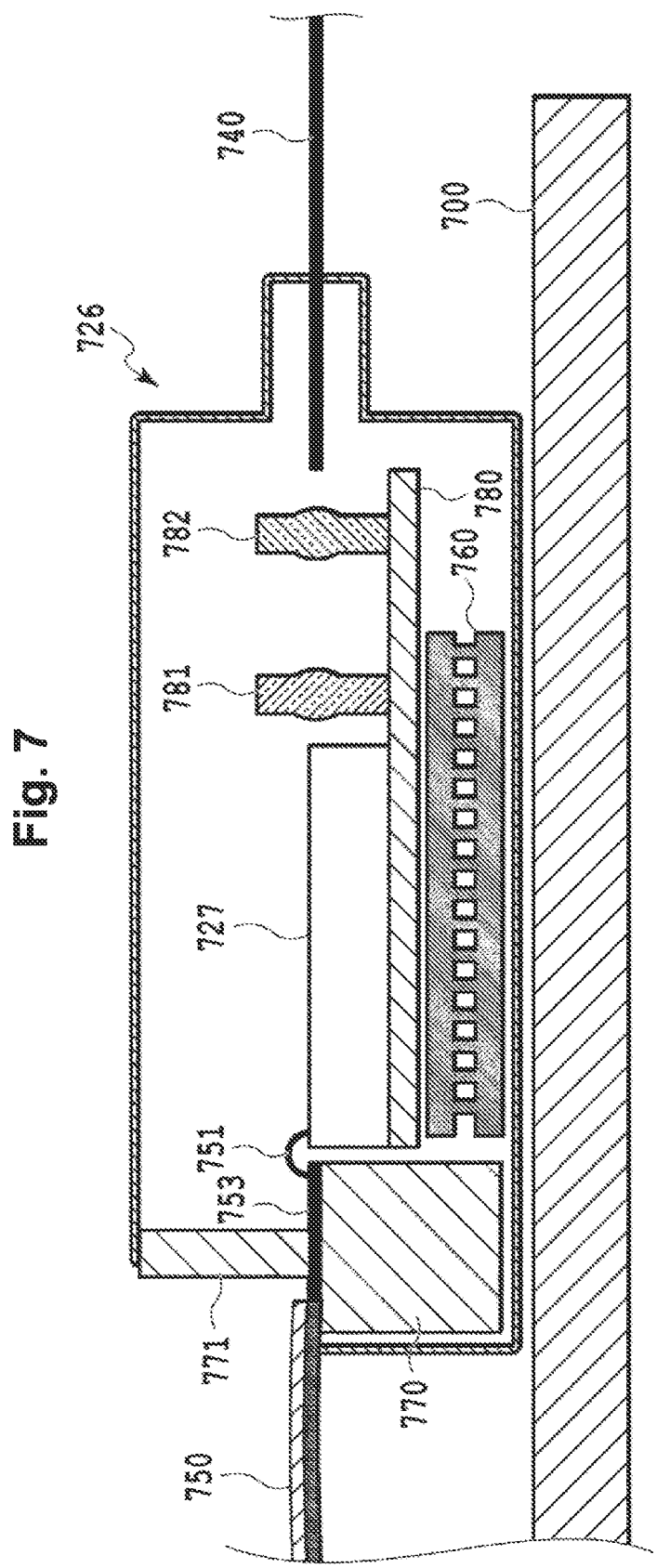
FIG. 7 is a sectional side view of the optical transmission-reception apparatus of Example 1 of the present invention.

FIG. 7 is a sectional side view of the optical transmission (modulation) module CDM 726 side of the optical transmission-reception apparatus according to Example 1 of the present invention. The optical reception module ICR 725 side also has approximately the same structure, and thus description of it is omitted. At least one of the optical transmission (modulation) module CDM 726 or the optical reception module ICR 725 may have FPC connection.

As illustrated in FIG. 7, the optical transmission (modulation) module CDM 726 is placed on a PCB substrate 700. On a temperature controller (TEC) 760 is placed a subcarrier (optical-device base) 780, on which are placed an optical modulator PIC 727, a chip condensing lens 781 (first lens), and a fiber condensing lens 782 (second lens), through which transmission light (modulated light) is outputted to optical fiber 740.

For the optical modulator PIC 727, an InP-based IQ optical modulation device having excellent wide bandwidth properties is employed in this example. The optical modulation device employs an InP substrate and has at least two or more Mach-Zehnder optical interference waveguides.

On the input side of the optical modulator PIC 727, a module-line substrate base 770 and a module package wall 771 are disposed as the package left wall of the optical transmission (modulation) module CDM 726. The module-line substrate base 770 and the module package wall 771 are formed of, for example, ceramic members having different thicknesses, and the step formed by the difference of the thicknesses forms a package terrace. The metal line pattern (lower layer) of an FPC 750 is connected to high-frequency line 753 on the upper surface of the module-line substrate base 770.

The high-frequency line 753 on the upper surface of the module-line substrate base 770 passes through the ceramic wall face between the module-line substrate base 770 and the module package wall 771 and inputs modulated electrical signals to the optical modulator PIC 727 via gold-wire wiring 751.

The module-line substrate base 770 may be formed as part of the FPC connector, or may be combined with the module package wall 771 into a connector composed of one or two integrated ceramic parts.

The wall surface continuing from the package terrace of the ceramic part connector may have a through hole which the high-frequency line 753 passes through, and the cross section of the through hole may be formed such that the upper portion of the high-frequency line 753 are like a cavity in the form of a tunnel.

This cavity may be formed such that the height of this cavity gradually decreases from a height larger than the thickness of the FPC 750 (to a height smaller than at least the thickness of the FPC 750), from the entrance of through hole at the wall face toward the inside of the module.

If the through hole is formed like this, only inserting an end of the FPC 750 into the cavity of the through hole generates pressing force between the metal line pattern of the lower layer of the FPC 750 and the high-frequency line 753, forming electrical connection.

Note that for long-term stability of the optical lenses, inert gas such as Ar or $N_2$ may be putted inside the module, and the module may be sealed hermetically.

Example 2

Figure 8:
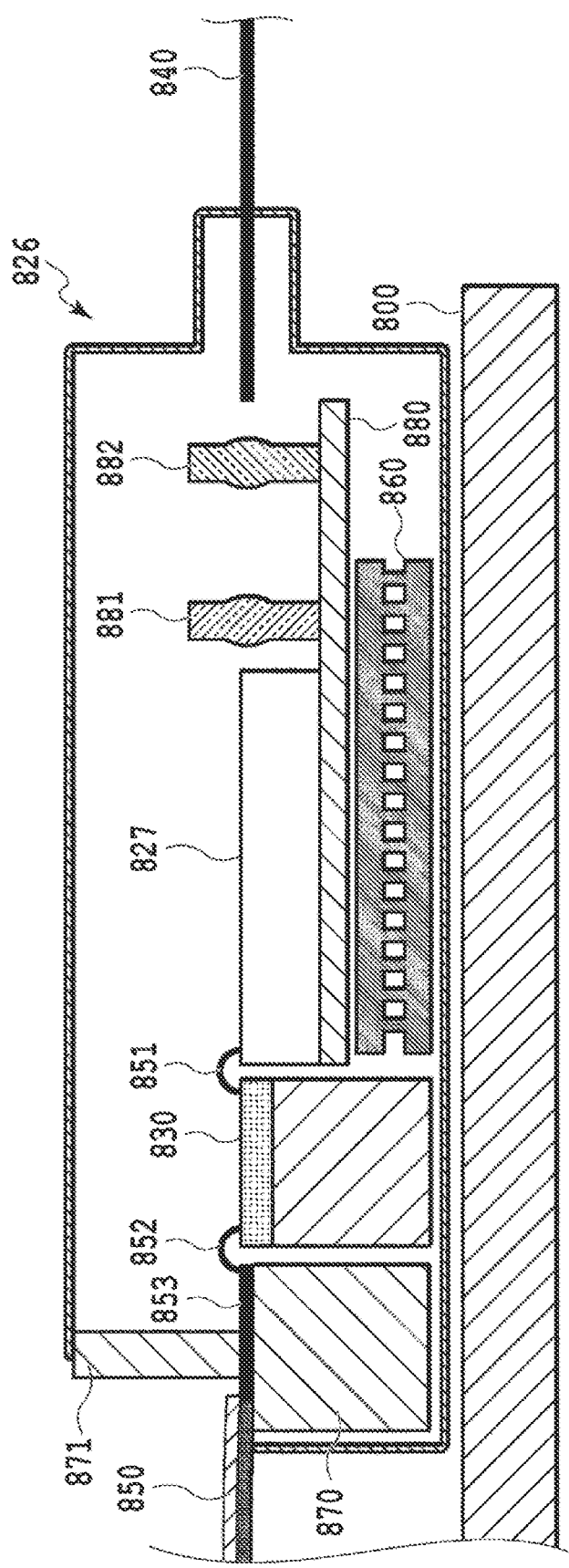
FIG. 8 is a sectional side view of an optical transmission-reception apparatus of Example 2 of the present invention.

A driver-IC-integrated optical transmission module as illustrated in FIG. 8 may be used as Example 2 of the present invention. The different point between the driver-IC-integrated optical transmission module 826 in FIG. 8 and the optical transmission module CDM 726 in FIG. 7 is that a high-frequency amplification IC 830 is disposed as a driver IC between a module-line substrate base 870 and an optical modulator PIC 827, and hence description of other portions will be omitted.

One advantage of the driver integration is that compensation for losses of high-frequency electrical signals resulting from line, modules, and the like and increase in modulation efficiency resulting from the signal gain can be expected. Another advantage is that configurations in which an InP modulator and a driver IC are integrally mounted are already widely recognized as CDM (as established techniques).

As in Example 1, the module-line substrate base 870 may be formed as part of the FPC connector and combined with a module package wall 871 into a connector composed of one or two integrated ceramic parts.

In these examples, differential signal line traces for the number of channels (high-frequency line traces, for example, G-S-S-G/channel) are provided on the DSP package substrate. Expansion line for changing the pitch of the high-frequency line traces into a pitch that matches the pitch of the connection channels of the FPCs (the expansion wiring 612 in FIG. 6) is provided as an expansion substrate. The FPCs are connected and fixed to the electrical-signal supply pads provided on the DSP package substrate with solder.

The FPC can be connected to the DSP package substrate by fixing an end of the FPC to the DSP package substrate by using connectors (connection mechanisms) such as FPC connectors for high-frequency transmission. Connector connection has advantages that heat damage to the DSP side can be avoided because connector connection does not give heat unlike solder fixation and that reduction in assembly cost can be expected.

Note that the interface for low-speed signals including DC signals can be connected to peripheral circuits via a higher-density BGA or the like as in conventional techniques. For the optical transmission-reception module side, any of SMT, FPC, and BGA can be used without any problem. In this example, an SMT type is used. The type of low-speed signal interface does not affect the effectiveness of the present invention.

Example 3

Lastly, as Example 3 of the present invention, FIG. 9 illustrates a configuration example in which an IC-TROSA module 925 into which optical transmission and optical reception are integrated (also including functional devices such as lasers) is used for the optical transmission-reception module. For the FPC connection between a DSP package substrate 910 and the IC-TROSA module 925, a pair of connectors can be used.

INDUSTRIAL APPLICABILITY

As has been described above, with the present invention, in an optical transmission-reception apparatus having a digital-signal processing circuit and including an optical transmitter (optical modulator) and an optical receiver, it is possible to connect, by using flexible printed circuits, a package substrate of the digital-signal processing circuit and optical modulation and optical reception modules in a wide bandwidth while preventing high-frequency losses, and this makes it possible to achieve a high-speed optical transmission-reception apparatus.

REFERENCE SIGNS LIST

100, 200, 300, 400, 500, 600, 700, 800, 900 PCB board substrate
101, 401, 501 BGA
102 Surface-mounted lead pin
110, 210, 310, 410, 510, 610 (DSP) Package substrate
111, 211, 311, 411, 511, 611 DSP-ASIC
120 Optical modulation (reception) module
130, 330 Driver/TIA
140, 240, 340, 440, 540, 640, 740, 840 Optical fiber
225, 525 (Integrally mounted) Optical modulation (optical reception) module
325, 727, 827 PIC
450, 550, 650, 750, 850 FPC (interface)
603 Low-speed signal interface
612 Expansion line
613 Connection PAD
626, 726 CDM
625, 725 ICR
751, 851, 852 Gold-wire wiring
753, 853 High-frequency line
760, 860 Temperature controller (TEC)
780, 880 Subcarrier (optical-device base)
770, 870 Module-line substrate base
771, 871 Module package wall
781, 881 Chip condensing lens (first lens)
782, 882 Fiber condensing lens (second lens)
830 High-frequency amplification IC
925 IC-TROSA module

The invention claimed is:

1. A high-speed optical transmission-reception apparatus comprising:
a digital-signal processing circuit;
at least one of an optical modulation module having at least a driver and an optical modulation device or an optical reception module having at least a transimpedance amplifier and an optical reception device;
a flexible printed circuit being used as a high-frequency interface for the optical modulation module and the optical reception module; and
a mechanism for connecting a high-frequency line pattern to the flexible printed circuit, the mechanism being provided on a package substrate of the digital-signal processing circuit,
wherein the package substrate and at least one of the optical modulation module or the optical reception module are directly connected by the flexible printed circuit, and
a 3 dB bandwidth of the optical modulation module or the optical reception module is higher than or equal to 50 GHz.

2. The high-speed optical transmission-reception apparatus according to claim 1, wherein
a temperature of the optical modulation device mounted on the optical modulation module is controlled by a temperature controller.

3. The high-speed optical transmission-reception apparatus according to claim 1, wherein
the optical modulation module is hermetically packaged.

4. The high-speed optical transmission-reception apparatus according to claim 1, wherein
an InP substrate is used for the optical modulation device mounted on the optical modulation module, and the optical modulation device includes at least two or more Mach-Zehnder optical interference waveguides.

5. The high-speed optical transmission-reception apparatus according to claim 1, wherein
the optical modulation module or the optical reception module includes, in addition to the optical modulation device or the optical reception device, a high-frequency amplification device.

6. The high-speed optical transmission-reception apparatus according to claim 1, wherein the mechanism that connects to the flexible printed circuit is configured by connector connection.

7. A high-speed optical transmission-reception apparatus comprising:
- a digital-signal processing circuit;
- at least one of an optical modulation module having at least a driver and an optical modulation device or an optical reception module having at least a transimpedance amplifier and an optical reception device;
- a flexible printed circuit being used as a high-frequency interface for the optical modulation module and the optical reception module; and
- a mechanism for connecting a high-frequency line pattern to the flexible printed circuit, the mechanism being provided on a package substrate of the digital-signal processing circuit,
- wherein the package substrate and at least one of the optical modulation module or the optical reception module are directly connected by the flexible printed circuit, and
- wherein a height difference between a height of a package terrace of the optical modulation module or the optical reception module and a height of an upper surface of the package substrate of the digital-signal processing circuit is less than or equal to 2 mm.

8. The high-speed optical transmission-reception apparatus according to claim 7, wherein the optical modulation module or the optical reception module includes, in addition to the optical modulation device or the optical reception device, a high-frequency amplification device.

9. The high-speed optical transmission-reception apparatus according to claim 7, wherein
- the mechanism that connects to the flexible printed circuit is configured by connector connection.

10. A high-speed optical transmission-reception apparatus comprising:
- a digital-signal processing circuit;
- at least one of an optical modulation module having at least a driver and an optical modulation device or an optical reception module having at least a transimpedance amplifier and an optical reception device;
- a flexible printed circuit being used as a high-frequency interface for the optical modulation module and the optical reception module; and
- a mechanism for connecting a high-frequency line pattern to the flexible printed circuit, the mechanism being provided on a package substrate of the digital-signal processing circuit, the high-frequency line pattern being formed on the package substrate,
- wherein the package substrate and at least one of the optical modulation module or the optical reception module are connected by the flexible printed circuit,
- wherein the package substrate and at least one of the optical modulation module or the optical reception module connected by the flexible printed circuit are mounted on a common printed circuit board.

11. The high-speed optical transmission-reception apparatus according to claim 10, wherein the optical modulation module or the optical reception module includes, in addition to the optical modulation device or the optical reception device, a high-frequency amplification device.

12. The high-speed optical transmission-reception apparatus according to claim 10, wherein
- the mechanism that connects to the flexible printed circuit includes a connector connection or connection pads being directly connected to the flexible printed circuit.

* * * * *